US010409818B1

(12) United States Patent
Hayes et al.

(10) Patent No.: US 10,409,818 B1
(45) Date of Patent: Sep. 10, 2019

(54) POPULATING STREAMS OF CONTENT

(71) Applicant: Google LLC, Mountain View, CA (US)

(72) Inventors: Matthew Hayes, San Mateo, CA (US); Hariharan Chandrasekaran, Sunnyvale, CA (US); Harish Chandran, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 364 days.

(21) Appl. No.: 15/228,756

(22) Filed: Aug. 4, 2016

(51) Int. Cl.
*G06F 16/00* (2019.01)
*G06F 16/2455* (2019.01)
*G06F 16/248* (2019.01)
*G06F 16/901* (2019.01)
*G06F 16/2457* (2019.01)

(52) U.S. Cl.
CPC ...... *G06F 16/24568* (2019.01); *G06F 16/248* (2019.01); *G06F 16/24578* (2019.01); *G06F 16/9024* (2019.01)

(58) Field of Classification Search
CPC ......... G06F 17/30861; G06F 17/30864; G06F 16/24568; G06F 16/24578; G06F 16/248; G06F 16/9024
USPC ........................................ 707/706, 723, 726
See application file for complete search history.

(56) References Cited

U.S. PATENT DOCUMENTS

| | | | | |
|---|---|---|---|---|
| 8,046,351 B2* | 10/2011 | Song | ...................... | G06F 16/951 707/710 |
| 8,078,603 B1* | 12/2011 | Chandratillake | ... | G06F 17/3084 707/706 |
| 8,255,386 B1* | 8/2012 | Annau | ................ | G06F 17/3089 707/711 |
| 8,326,826 B1* | 12/2012 | Upstill | .............. | G06F 16/24534 707/723 |
| 8,515,968 B1* | 8/2013 | Bayardo | ................ | G06Q 30/00 707/748 |
| 8,812,520 B1* | 8/2014 | Sandler | ................ | G06F 16/951 707/748 |
| 8,838,613 B1 | 9/2014 | Thakur et al. | | |
| 8,874,558 B1* | 10/2014 | He | ........................ | G06F 16/951 707/723 |
| 9,063,984 B1* | 6/2015 | Sandland | .......... | G06F 16/24578 |
| 9,146,972 B2* | 9/2015 | Chang | .................... | G06F 16/951 |
| 9,246,957 B2* | 1/2016 | Moeinifar | ............. | H04L 65/403 |
| 9,542,669 B1* | 1/2017 | Browning | ............ | G06Q 10/109 |
| 9,836,554 B2* | 12/2017 | Deng | ................ | G06F 16/90324 |

(Continued)

*Primary Examiner* — Hanh B Thai
(74) *Attorney, Agent, or Firm* — Fish & Richardson P.C.

(57) ABSTRACT

Methods, systems, apparatus, including computer programs encoded on computer storage medium, for a bottom-up approach for generating high-quality content streams. In one aspect, the method includes actions of obtaining data identifying a plurality of content items, generating a plurality of queries for the particular topic, and for each query of the plurality of queries: obtaining a set of search results for the query that identify content items identified in the obtained data, and determining, from the search results for the query, a respective quality score for each of one or more quality characteristics. The method may also include actions such as identifying one or more first high-quality queries from the plurality of queries based on the respective quality scores for the one or more quality characteristics, and populating a stream of content for display on the user device using search results for the one or more first high-quality queries.

20 Claims, 5 Drawing Sheets

(56) References Cited

U.S. PATENT DOCUMENTS

| | | | |
|---|---|---|---|
| 2006/0190534 A1* | 8/2006 | Nagano | H04L 67/2828 709/203 |
| 2008/0249786 A1* | 10/2008 | Oldham | G06F 17/30864 705/1.1 |
| 2013/0042015 A1* | 2/2013 | Begen | B63B 15/0083 709/231 |
| 2013/0297581 A1* | 11/2013 | Ghosh | G06F 17/30864 707/706 |
| 2014/0052540 A1* | 2/2014 | Rajaram | G06Q 30/0255 705/14.66 |
| 2014/0280214 A1 | 9/2014 | Han et al. | |
| 2015/0012524 A1* | 1/2015 | Heymans | G06F 17/30424 707/722 |
| 2015/0012558 A1* | 1/2015 | Heymans | G06F 17/30867 707/765 |
| 2015/0095329 A1* | 4/2015 | Sanio | G06F 17/30038 707/732 |
| 2015/0142888 A1* | 5/2015 | Browning | H04L 12/1831 709/204 |
| 2015/0169577 A1* | 6/2015 | Gu | G06Q 30/0282 707/726 |
| 2015/0169749 A1* | 6/2015 | Camelo | G06F 17/30864 707/706 |
| 2016/0012053 A1* | 1/2016 | Weening | G06F 17/30029 707/723 |
| 2016/0373454 A1* | 12/2016 | Ball | H04L 51/12 |
| 2017/0235789 A1* | 8/2017 | Podgorny | G06F 17/30646 707/772 |
| 2017/0285912 A1* | 10/2017 | Kaemmerer | G06F 3/0481 |

\* cited by examiner

POPULATING STREAMS OF CONTENT

BACKGROUND

Social media platforms are increasingly used as a source of content. In addition to individuals posting on their own respective social media page, numerous media outlets also publish their content via social media platforms. This has led to large amounts of information being shared. However, several challenges exist to ensuring that one or more streams of content provided to a user device via a social media platform include high-quality content.

SUMMARY

According to at least one implementation, the subject matter of this specification may be embodied in a method for populating a stream of content relating to a particular topic. The method may include the actions of obtaining data identifying a plurality of content items that may relate to the particular topic, generating a plurality of queries for the particular topic, and for each query of the plurality of queries: obtaining a set of search results for the query that identify content items identified in the obtained data, and determining, from the search results for the query, a respective quality score for each of one or more quality characteristics. The method may also include actions such as identifying one or more first high-quality queries from the plurality of queries based on the respective quality scores for the one or more quality characteristics, receiving a content request for presenting a stream of content relating to the particular topic on a user device, populating the stream of content using search results for the one or more first high-quality queries, and providing the stream of content for display on the user device.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These and other aspects may optionally include one or more of the following features. For instance, in some implementations, the method may also include obtaining data related to multiple different topics, wherein the obtained data corresponds to one or more social media posts that each originate from one or more disparate social media sources including one or more social media pages of respective individuals, one or more social media community pages, or one or more social media hashtags, clustering the obtained data into a set of one or more groups based on a topic that is associated with each respective post, and identifying one or more second high-quality queries that correspond to each respective topic.

In some implementations, the method may also include generating a set of one or more links for display on an interface of the user device, wherein each of the one or more links is associated with at least one of the second high-quality queries, receiving a selection of a particular link of the generated set of links, in response to a selection of the particular link of the generated set of links, executing the at least one second high-quality query that is associated with the particular link, and populating a stream of content using search results for the at least one second high-quality query.

In some implementations, obtaining data identifying a plurality of content items that may relate to the particular topic may include obtaining data from at least two indices, wherein the two or more indices include a first index that organizes data in a database based on topic and a second index that organizes data in a database based on a user's social media profile.

In some implementations, identifying one or more high-quality queries from the plurality of queries based on the quality scores for the quality characteristics may include for each respective set of search results obtained for each of the plurality of queries: determining that a particular value of at least one quality characteristic that is associated with the respective set of search results exceeds a predetermined minimum threshold, and in response to determining that the particular value of at least one quality characteristic that is associated with the respective set of search results exceeds the predetermined minimum threshold, adding the high-quality query that corresponds to the respective set of search results to the identified queries.

In some implementations, identifying one or more high-quality queries from the plurality of queries based on the quality scores for the quality characteristics comprises for each respective set of search results obtained for each of the plurality of queries: determining that a particular value of multiple quality characteristics that are associated with the respective set of search results exceeds a predetermined minimum threshold, and in response to determining that the particular value of multiple quality characteristics that are associated with the respective set of search results exceeds the predetermined minimum threshold, adding the high-quality query that corresponds to the respective set of search results to the identified queries.

In some implementations, the method may also include accessing a first node of a graph that corresponds to a stream of content that is associated with the provided stream of content, analyzing the edges from the first node to other nodes in the content stream graph to identify one or more other nodes that are each associated with a candidate stream of content that is similar to the provided stream of content, and providing a recommendation identifying the streams of content corresponding to the one or more other nodes for presentation on the user device.

In some implementations, determining, from the search results for the query, a respective quality score for each of one or more quality characteristics may include determining a precision quality score that is based, at least in part, on a ratio of the number of search results returned by a particular query related to a particular topic over the total number of search results returned by the query. Alternatively, or in addition, the method may also include determining a velocity quality score that is based, at least in part, on the number of search results responsive to the query that were posted within a recent time window. Alternatively, or in addition, the method may also include determining a feedback quality score that is based, at least in part, on the number of engagements associated with the set of search results. Alternatively, or in addition, the method may also include determining a recall quality score that is based, at least in part, on the ratio of top content items that are included in the set of search results over the total number of search results returned by the query.

The present disclosure provides an automated mechanism for generating high-quality content streams. Particular embodiments of the subject matter described in this disclosure can be implemented so as to realize one or more of the following advantages. Aspects of the present disclosure are particularly advantageous because they use a bottom-up approach to populating a content stream. The bottom-up approach improves on a top-down approach because the results of queries are evaluated to determine whether the results of the queries include high-quality content prior to populating a stream of content with content items included in the results of the query. The subject matter of the present disclosure optimizes the use of network bandwidth by only populating streams of content with high-quality content (as opposed to all content). responsive to the queries). In addition, the present disclosure reduces the latency from receiving the request to populating a content stream because the high-quality queries are identified in advance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Aspects of the subject matter disclosed by the present specification are related to a bottom-up approach for generating high-quality content streams. A bottom-up approach for generating a high-quality content stream includes generating content queries and evaluating the search results of the generated content queries prior to using the search results to populate a stream of content. The search results can be evaluated to determine a respective quality score for one or more quality characteristics associated with the search results of each query. Based on the respective quality scores, one or more high-quality queries can be selected from the generated queries. Then, in some implementations, search results from the one or more high-quality queries can be used to populate a stream of content, and ensure that a high-quality stream of content is provided to a user device.

The subject matter disclosed by the present specification improves a computer system by optimizing the use of network bandwidth. The present disclosure optimizes network bandwidth by only using content items included in search results from high-quality queries to populate a stream of content and not all content from all queries that identify content items related to the content stream.

Figure 1:
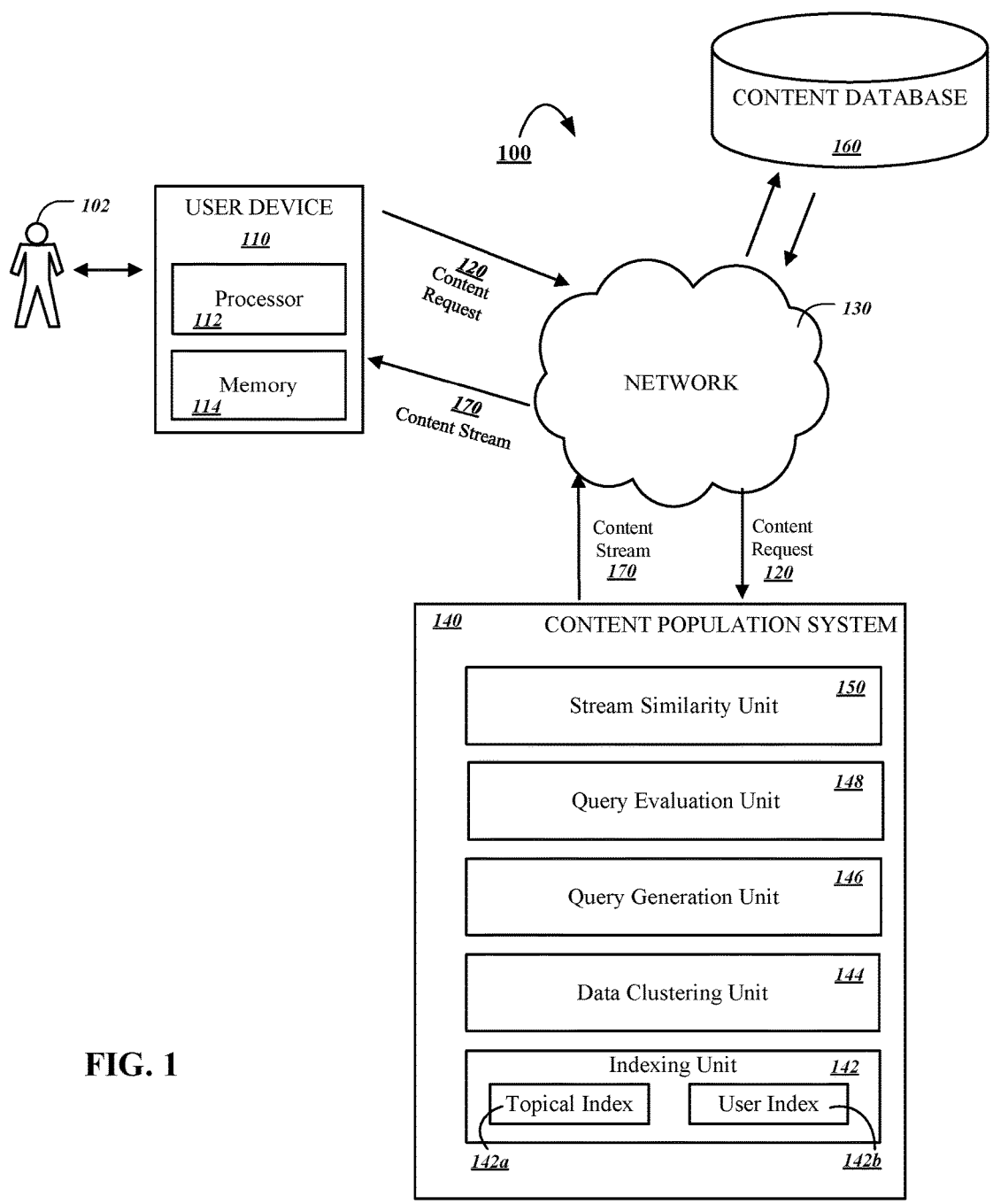
FIG. 1 shows an example of a system for populating streams of content.

FIG. 1 shows an example of a content population system 140 that generates content streams. The content population system 140 may be implemented as computer programs on one or more computers in one or more locations, in which the systems, components, and techniques described below can be implemented. Each of the one or more computers executing computer programs implementing the content population system 140 include at least one processor and one or more memory devices.

A user 102 operates a user device 110 that interacts with the content population system 140. For example, the user device 110 can be a computer coupled to the content population system 140 through a data communications network 130. The communications network 130 may include, for example, a local area network (LAN), a wide area network (WAN), a cellular data network, the Internet, or a combination of these or other networks. The user device 110 generally includes a processor 112 for executing stored instructions and a memory 114, such as a random access memory (RAM), for storing instructions and data. The memory 114 may include both read only and writeable memory.

The user device 110 can transmit a content request 120 through the network 130 to the content population system 140. The content request 120 may be, for example, a request for content related to a particular topic. In some implementations, the user 102 may instruct the user device 110 to transmit the content request 120. For example, the user may select a link associated with a particular topic that, when selected, initiates generation of a stream of content 170 that is populated with content related to the particular topic. For instance, the user may select a link corresponding to the topic "Election 2016." In response to the selection of the link, the content population system 140 may return a stream of content 170 related to the 2016 election. In some implementations, the content population system 140 populates a content stream 170 by accessing a high-quality query associated with the topic selected by the user, and using the search results of the high-quality query to populate the stream of content 170.

Alternatively, or in addition, the user device 110 may transmit the content request 120 through the network 130 to the content population system 140 independent of an express user indication to request content. For example, in some implementations, the content request 120 is transmitted by the user device 110 to the content population system 140 in order to obtain streams of content related to topics identified in a user's profile. Such requests for content may be initiated, for example, when it is determined that a user has logged into a particular web application such as for example, a social network platform, a news webpage, a video streaming webpage, an e-commerce webpage, or the like. Though the preceding example is based on topics listed in a user's profile when the user logs-in to a particular web application, the present disclosure need not be so limited. Indeed, other types of content requests that are not triggered by an express user indication to request content fall within the scope of the present disclosure. For instance, a user device 110 may submit a content request in response to a determination that a user navigates back to the user's social media profile page, a newsfeed, or the like. Alternatively, or in addition, content requests independent of an express user indication to request content may be transmitted to a content population system 140 when, for example, a user 102 visits a particular web page based on default topics established by the host of the web page.

The content population system 140 is configured to receive the content request 120 and populate a stream of content 170. The content population system 140 can then provide the populated content stream 170 to the user device 110 through the network 130. A content stream 170 may include one or more content items that are each related to a particular topic. For instance, in some implementations, a content stream 170 may include one or more content items related to the 2016 election. As another example, a content stream 170 may include one or more content items related to financial markets. Alternatively, a content stream 170 may include one or more content items related to, for example, sports, a particular sports team, or the like. In some implementations, the content population system 140 populates a content stream 170 by accessing a high-quality query associated with the topic selected by the user, and using the search results of the high-quality query to populate the stream of content 170.

In some implementations, the one or more content items that are used to populate the content stream 170 may include one or more posts from a social media platform that are determined to be related to a particular topic associated with the content stream 170. For instance, one or more social media posts related to the 2016 election may be used to populate the content stream 170 in response to a content request 120 for content related to the 2016 election. However, the subject matter of the present disclosure need not be limited to populating the content stream 170 with posts from a social media platform. Instead, other types of content items may be used to populate the content stream 170. Other types of content items may include, for example, news articles, publications, audio files, video files, blogs, or the like each of which may, or may not, have previously been posted to a social media platform. Accordingly, any type of content item that is identified as being related to a topic associated with a content request 120 may be used to populate a content stream 170.

The content population system 140 includes an indexing unit 142, a data clustering unit 144, a query generation unit 146, a query evaluation unit 148, and a stream similarity unit 150. In this specification, the term "unit" will be used broadly to refer to a software based system or subsystem that can perform one or more specific functions. Generally, a unit will be implemented as one or more software modules or components, installed on one or more computers in one or more locations; in other cases, multiple units can be installed on the same computer or computers.

The indexing unit 142 is used to efficiently access data stored in a content database 160. The indexing unit 142 may maintain one or more respective index entries for each respective content item stored in the content database 160. Each index entry may include one or more features associated with a corresponding content item and information related to the address where the content item is stored in the content database 160. In some implementations, each index entry may also include other types of information associated with each respective content item, for example, a topic associated with the content item, destination streams, various engagement counts, or the like. Alternatively, or in addition, each index entry may include a respective topicality score for each of multiple topics that the index entry may be associated with. The topicality score may be indicative of the likelihood that a content item is associated with a particular topic. The topicality score may be determined automatically based on, for example, an analysis of keywords associated with a content item, metadata tags associated with the content item, the entity that posted the content item, or the like. Alternatively, or in addition, the topicality score for one or more content items may be manually determined by one or more expert users associated with the content population system 140. In some implementations, a particular content item that is later identified as a search result in a set of search results may be determined to correspond to a particular topic only if the particular content item is associated with a topicality score that exceeds a predetermined minimum threshold. The indexing unit 142 makes access to content items in the content database 160 more efficient by reducing the time it takes to access data in the content database 160. Although it is shown and described that the content items are stored in a single content database 160, it is contemplated that some implementations store and retrieve content items from multiple different databases on multiple different servers in multiple different locations.

In some implementations, the indexing unit 142 may use an embedding model. The embedding model may include, for example, a low-dimensional data model that, when provided a particular topic such as a topic received in a query, can identify other topics that are similar to the particular topic associated with the received query. Thus, an indexing unit 142 that uses the data model can facilitate identification of index entries corresponding to content items that are associated with a topic that is similar to a particular topic included in a query even though one or more of the identified index entries are not explicitly associated with the particular topic. In some instances, this may allow the indexing unit 142 to be searchable using one or more abstract tokens. For instance, when given an abstract token as an input, the embedding model may determine a set of one or more topics that can be used to facilitate the search of the indexing unit 142. The embedding model may be trained off-line independent of the processes described herein in FIGS. 2-5 using training data available to the content population system 140. Once trained, the embedding model provides a machine learning approach built into the indexing unit 142 that allows the content population system 140 to realize serving-time performance gains by reducing latency involved in identifying index entries corresponding to content items that are associated with a topic that is different than, but related to, a query topic.

The indexing unit 142 may maintain one or more different indices. In some implementations, each index of the one or more indices may organize data stored in content database 160 in a different way. For example, the indexing unit 142 may maintain a topical index 142a that is configured to organize the data maintained by content database 160 based on topic. The topical index 142a may be searched to identify content items related to a particular topic such as "financial markets." In response to a search of the topical index 142a for the topic "financial markets," content items related to financial markets may be obtained independent of the social media source of the social media post. Alternatively, or in addition, the indexing unit 142 may include a user index 142b that is configured to organize the data maintained by content database 160 based on user, or entity, profiles. The user index 142b may be searched to identify content items submitted to a social media platform by a particular user, or entity, such as "Warren Buffet." In response to a search of the user index 142b based on the user "Warren Buffet," content items submitted by Warren Buffet may be obtained independent of the topic of the social media post. The user index 142b may be similarly searched for posts submitted by other entities such as particular communities of users. For example, the user index 142b may be searched in order to identify all posts submitted by people who are members of the "Garden Club." Though only two indices such as the topical index 142a and user index 142b are discussed above, the present disclosure should not be so limited. Instead, it is contemplated that one or more other types of indices that organize data in the content database 160 in different ways also fall within the scope of the subject matter disclosed by this specification.

The data clustering unit 144 obtains data related to one or more topics using the indexing unit 142. The data obtained by the data clustering unit 144 may include data related to content items that were submitted using a social media platform. The content items may be associated with one or more disparate social media sources. Disparate social media sources may include, for example, a social media page of a particular individual, a social media community page, a social media hashtag, or the like.

In some implementations, the data clustering unit 144 may obtain data from the content database 160 using both the topical index 142a and the user index 142b. This may include, for example, copying one or more fields from the topical index 142a and the user index 142b in order to create a cached social media post table. Each row of the table may represent a particular social media post. Each column of the table may represent other data obtained using the topical index 142a and the user index 142b such as a topic that is associated with the social media post, one or more engagement counts associated with the social media posts, and destination streams of the social media post.

The data clustering unit 144 may cluster the obtained data into one or more groups based on topic. Clustering the obtained data may include, for example, analyzing metadata associated with each social media post that was previously obtained in order to determine one or more topics associated with the post. In addition, some implementations may include a system that generates a post-specific feedback score for each social media post that is based on the number of occurrences associated with the post and the level of engagement associated with the post. The post-specific feedback score may be used to promote inclusion of topics, social media posts, social media profile pages, social media community pages, or the like, in a stream of content that drive engagement and have a high velocity. The data clustering unit 144 may be able to determine the top content items such as the top social media posts for each topic, the top topics present among social media posts, or the like based, at least in part, on the post-specific quality score. Alternatively, or in addition, the data clustering unit 144 may identify one or more other categories of metadata associated with a particular social media post individually, or in combination, in order to identify the top social media posts for each topic. The data clustering unit 142 may produce multiple groups of data that are each related to a respective topic.

The query generation unit 146 generates one or more queries that can be executed against the data obtained by the data clustering unit 144. In some implementations, the query generation unit 146 may generate, and execute, each of the one or more queries in advance of using the queries to populate a content stream 170. The one or more generated queries may be designed to obtain content items related to a particular topic. In some implementations, multiple queries related to the same topic may be generated, and executed against, the data obtained by the clustering unit 144 in order to generate multiple respective sets of search results for each generated query. The quality of the search results can then be evaluated in order to determine the set of search results that are associated with the highest quality content items for a particular topic.

Each respective query of the one or more generated queries may vary in scope. For instance, one or more of the queries may include topical query parameters in an effort to obtain one or more content items such as social media posts based on the topic associated with the posts. For example, queries may be generated for the topic of the 2016 presidential election that include parameters such as "Election 2016," "presidential election," "politics," "democratic convention," "republican convention," or the like. Such queries may result in the generation of search results that includes content items such as social media posts that are related the topics of the "presidential election," "politics," "democratic convention," "republican convention," or the like. Alternatively, or in addition, one or more of the queries may include entity-based query parameters that are used to obtain one or more content items such as social media posts associated with a particular entity that is determined to be associated with the particular topic. For example, queries may be generated for the topic of the 2016 presidential election that include parameters such as "Donald Trump," "Hillary Clinton," "Bill O'Reilly," "Chris Matthews," "Chris Wallace," or the like. Such queries may result in the generation of search results that correspond to content items submitted to a social media platform by each of the aforementioned entities.

Alternatively, or in addition, one or more of the queries may include a combination of topical query parameters and entity based query parameters. For example, queries may be generated for the topic of the 2016 presidential election that include parameters such as "Election 2016," "presidential election," "politics," "Donald Trump," and "Hillary Clinton." Such queries may result in the generation of search results related to the topic of the 2016 presidential election as well as content items such as personal social media posts submitted by Donald Trump and Hillary Clinton. Content items such as personal social media posts submitted by entities such as Donald Trump and Hillary Clinton may be determined to be relevant to the topic of the 2016 presidential election because Donald Trump and Hillary Clinton are entities who are known to be related to, or have an interest in, the 2016 presidential election. Accordingly, content items such as social media posts submitted to a social media platform by Donald Trump, Hillary Clinton, or both, may be considered high-quality content for inclusion in a content stream 170 related to the 2016 presidential election.

Each of the one or more queries may be generated in one or more ways. For instance, in some implementations, the queries may be automatically generated based on topics, entities, or both, that are determined to be related to a seed topic selected for a content stream 170. Alternatively, or in addition, one or more queries may be generated by one or more expert users that determine types of queries that may be designed to generate content related to a seed topic selected for a content stream 170. Alternatively, or in addition, one or more queries may be obtained from queries submitted to a social media platform by users seeking information related to a seed topic for a content stream 170.

The query evaluation unit 148 evaluates the search results that are obtained in response to the execution of one or more queries generated by the query generation unit 146. In particular, the query evaluation unit 148 evaluates the search results to determine a set of quality scores for one or more quality characteristics. In some implementations, the quality characteristics may include precision, velocity, feedback, and recall.

The query evaluation unit 148 may evaluate search results identified as responsive to each of the one or more queries generated by the query generation unit 148 with respect to a precision quality characteristic. For instance, the query evaluation unit 148 may calculate a precision quality score that is indicative of the number of search results obtained by a query that are related to a particular topic. For instance, if the topic for a content stream is "financial markets," the precision of a set of search results will be based on the number of search results responsive to a query that are related to the topic of "financial markets." In some implementations, the precision of the search results may be represented by a ratio of the number of search results returned by a particular query related to a particular topic over the total number of search results returned by the query. However, a precision quality score may be calculated in any number of other ways. For instance, a precision quality score may also be based, at least in part, on the age of search results identified as responsive to a query, the velocity of the posts identified as responsive to a query, or both. For instance, in some implementations, a precision quality score may be calculated by determining the number of search results responsive to a query related to the topic of "financial markets" that correspond to content items that were posted in the last hour over the total number of search results responsive to the query that correspond to content items that were posted in the last hour. The precision quality score is directly proportional to the level of precision associated with a set of search results.

Alternatively, or in addition, the query evaluation unit 148 may evaluate search results responsive to each of the one or more queries generated by the query generation unit 148 with respect to a velocity quality characteristic. For instance, the query evaluation unit 148 may calculate a velocity quality score that is based on the number of search results responsive to the query that were posted recently, for example, within a recent time window. For instance, a velocity quality score may be indicative of the number of search results responsive to a generated query that correspond to content items that were posted in the last hour. Alternatively, or in addition, a velocity quality score may be indicative of the number of search results responsive to the generated query that correspond to content items that were posted in the last 24 hours. The velocity quality score is directly proportional to the level of velocity associated with a set of search results.

Alternatively, or in addition, the query evaluation unit 148 may evaluate search results responsive to each of the one or more queries generated by the query generation unit 148 with respect to a feedback quality characteristic. For instance, the query generation unit 148 may calculate a feedback score that is based on the number of engagements, reads, or both that are associated with the content items corresponding to search results responsive to the generated query. Generally, an engagement is an indication of user interaction with a post. Such engagements may include, for example, user-submitted actions like +1 s, likes, reactions, saving the post for later, or the like. Alternatively, or in addition, engagement may also consider user-submitted actions like −1 s, dislikes, down votes, or the like. Reads may include, for example, an indication that a user read the post, an article linked to by the post, or the like. The feedback quality score is directly proportional to the level of feedback associated with a set of search results.

Alternatively, or in addition, the query evaluation unit 148 may evaluate search results responsive to each of the one or more queries generated by the query generation unit 148 with respect to a recall quality characteristic. For instance, the query generation unit 148 may calculate a recall quality score for a set of search results that is indicative of a ratio of the number of top content items that are included in the set of search results over the total number of search results in the set of search results. Top content items may be identified, for example, based on engagement count. In addition, the content population system 140 may track a predetermined number of top content items related to a particular topic. By way of example, the content population system 140 may maintain a list of the top 25 social media posts for each topic that have the highest engagement count. The query evaluation unit 148 may then calculate recall for a particular set of search results by determining the ratio of the top social media posts for a particular topic that are included in the particular set of search results over the total number of search results in the particular set of search results. The recall quality score is directly proportional to the level of recall associated with a set of search results.

The query evaluation unit 148 analyzes the set of quality scores for each set of search results to determine whether the query in response to which the set of search results were generated is a high-quality query. A query may be a high-quality query if, for example, the query returns high-quality search results that can be used to populate a content stream. For example, the query evaluation unit 148 may determine whether the quality scores corresponding to one or more quality characteristics associated with a set of search results exceeds a predetermined minimum threshold. In such an example, a set of search results may be considered to be high-quality search results if the quality score for at least one quality characteristic associated with the set of search results such as precision, velocity, feedback, or recall exceeds a predetermined minimum threshold. Alternatively, in at least one implementation, the query evaluation unit 148 may determine that a set of search results are high-quality only if each quality score for each of a plurality of quality characteristics related to the set of search results exceeds a predetermined minimum threshold. In such an example, a set of search results may be considered to be high-quality search results if the respective quality score for quality characteristics such as for precision, velocity, feedback, and recall each exceed a predetermined minimum threshold. The query evaluation unit 148 may identify each of the one or more generated queries that correspond to a set of high-quality search results. The identified queries may then be used to populate one or more content streams.

The stream similarity unit 150 determines whether there are any other candidate streams of content that are similar to the stream of content 170 being provided to the user device 110 that are available for presentation to the user device 110. In some implementations, the stream similarity unit 150 may identify one or more other candidate streams of content based on a determination that the one or more other candidate streams fall within a predetermined similarity threshold of the one or more streams of content 170 being provided to the user 102. A candidate stream of content may be determined to be similar to a stream of content 170 being provided to a user device 110 if, for example, more than a predetermined percentage of content items in each respective stream of content share the same topic. A content item may be determined to be associated with a particular topic if the content item is associated with a topicality score for at least one topic that is above a predetermined threshold. In some implementations, for example, the stream of content 170 provided to a user device 110 may be associated with the topic "politics." In response to determining that the stream of content 170 provided to the user device 110 is associated with the topic "politics," the stream similarity unit 150 may identify "Election 2016," "Democratic Primary Race," and "Republican Primary Race," as candidate streams of content suitable for recommendation to the user device 110. Such streams of content may be identified as candidate streams of content because they each fall within a predetermined similarity threshold of the "politics" stream of content provided to the user device. In some implementations, the aforementioned streams of content may be determined to fall within a predetermined similarity threshold of the "politics" stream of content because, based on an evaluation of the posts in each respective content stream, each of the candidate streams of content and the "politics" stream of content where to determined to share a high percentage number of posts that are related to the same topic such as "politics," "elections," "government," or the like.

In some implementations, the stream similarity unit 150 may calculate such percentages dynamically, at run time. Alternatively, the stream similarity unit 150 may utilize a graph structure to identify streams of content that may be similar to a stream of content 170 currently being provided to a user device 110. For instance, a stream of content graph may be generated in advance of a user's interaction with the content population system 140. Each node of the graph structure may correspond to a particular stream of content that is associated with one or more topics as well as one or more high quality queries that can be used to populate the particular stream of content. In addition, each edge of the graph that connects two nodes may correspond to a predetermined level of similarity between the two streams corresponding to the two nodes associated with the graph edge. In some implementations, an edge between two nodes of the graph structure may only be created if the similarity between the respective content streams corresponding to the two nodes connected by the graph edge exceeds a predetermined similarity threshold. In some implementations, the similarity level between two streams of content may be based on an evaluation of the percentage of posts in each respective stream of content that share the same topic. In such implementations, in response to determining that a particular stream of content is being provided to the user device 110, the stream similarity unit 150 may access the graph structure, identify the node that corresponds to the particular stream of content being provided to the user device 110, and traverse each edge of the graph emanating from the identified node in order to identify one or more other nodes that correspond to candidate streams of content that are similar to the stream of content 170 being provided to the user device 110.

The content population system 140 may provide one or more recommendation links through the network 230 to the user device 110 for display on the user device 110. Each of the one or more recommendation links are associated with one of the candidate streams of content identified as similar to the one stream of content 170 provided to the user device 110. In addition, each of the one or more recommendation links are also associated with one or more high-quality queries that are related to the stream of content associated with the link. For instance, the content population system 140 may provide a recommendation link for the topic "Election 2016" for display on the user device 110 after determining that the content population system 140 is providing a stream of content 170 to a user device 110 that is related to "politics." In response to the selection of the recommendation link related to the topic "Election 2016," one or more high-quality queries identified by the content population system 140 may be executed in order to populate a stream of content provided to the user device 110 related to the topic "Election 2016." The set of recommendation links may be refreshed upon the providing of another stream of content to the user device 110. Alternatively, or in addition, recommendation links may also be provided to the user device 110 in the manner described above based on one or more topics stored in a user's 102 user profile.

Figure 2:
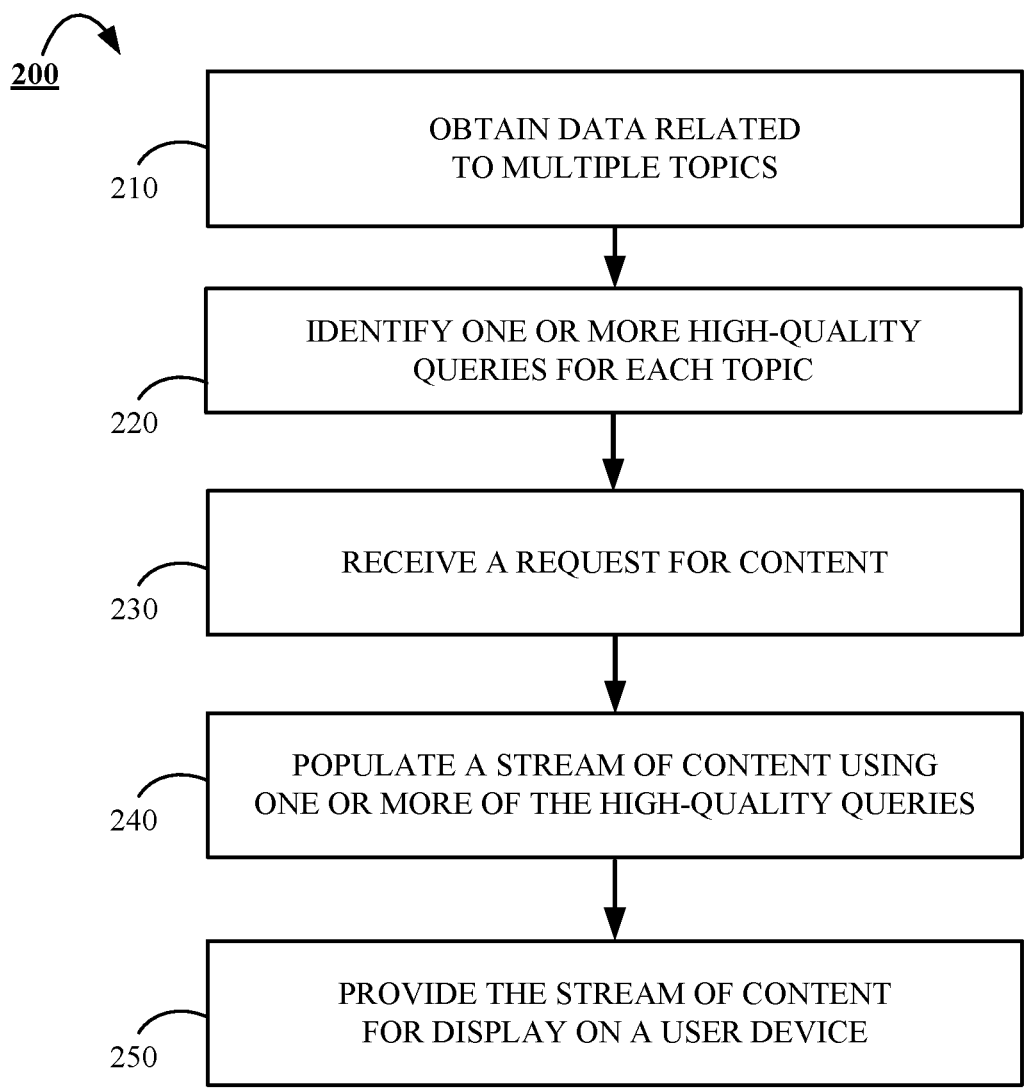
FIG. 2 is a flowchart of an example of a process for populating streams of content.

FIG. 2 is a flowchart of an example of a process 200 for populating content streams. For convenience, the process 200 will be described as being performed by a system of one or more computers located in one or more locations. For example, a content population system, e.g., the content population system 140, appropriately programmed in accordance with this specification, can perform the process 200.

The process 200 begins when the system obtains 210 data related to one or more topics from a content database. The obtained data may include, for example, data that corresponds to multiple respective content items that have been submitted to a social media platform by multiple respective users of the social media platform. In some implementations, the data may be obtained using one or more indices that each provide a unique organization of the data maintained in the content database. For example, the system may access an index that topically organizes the data in the content database. Alternatively, or in addition, the system may access an index that organizes the data in the content database based user, or entity, profiles.

The topics for which data is obtained may include any topic such as, for example financial markets, politics, sports, technology, or the like. Alternatively, or in addition, the topics for which data is obtained may be more specific such as, for example, U.S. stocks, election 2016, national football league news, artificial intelligence, or the like. Such topics for which data is obtained may be based on a predetermined list of seed topics. Alternatively, or in addition, such topics may be determined based on a dynamic determination of topics that are currently trending on a social media platform. After the data is obtained by the system, the obtained data may be clustered based on topic.

The system identifies 220 one or more high-quality queries for each of the one or more topics for which data was obtained at stage 210 using a bottom-up approach. The bottom-up approach includes evaluating respective sets of search results of one or more queries generated by the system to determine a quality score for one or more respective quality characteristics. In one implementation, the generated queries are executed against the data obtained at stage 210. The quality characteristics may include, for example, precision, velocity, feedback, recall, or the like. If an evaluation of a set of search results indicates that the search results are high-quality search results, then the corresponding query whose execution resulted in the generation of the high-quality search results will be identified as a high-quality query. In some implementations, a set of search results may be determined to be high-quality search results if a respective quality score for each of one or more quality characteristics exceeds a predetermined minimum threshold. Alternatively, in other implementations, a set of search results may be determined to be high-quality search results if a respective quality score for at least one or more quality characteristics exceeds a predetermined minimum threshold. Determining high-quality queries for a topic is described in more detail below with reference to FIG. 3.

The system receives 230 a request for content at stage 230. The request for content may be a request that is input from a user of client-side user device such as the selection of a hyperlink, input of a topical search query, or the like. Alternatively, or in addition, the request for content may be provided independent of an express user request for content. For instance, the content request may be transmitted to the system after a user logs-in to a social media platform. Such a request may be based, for example, on one or more topics maintained in a user's profile. Alternatively, or in addition, a request for content may be generated based on a default profile associated with a particular website.

At stage 240, the system may populate a stream of content using one or more of the high-quality queries identified at stage 220. For instance, the system may determine that a content request received at stage 230 is received for content related to the topic of "financial markets." Then, based on the received content request, the system obtains the query identified at stage 220 for the topic "financial markets" and uses the search results of the query identified at stage 220 for "financial markets" to populate a stream of content in response to the user's request for content. For example, the system may select at least a subset of the search results identifying content items that are response to the high-quality query identified at stage 220. The subset of the search results may be ordered based on one or more scores associated with the search results such as a feedback score. Then, the search results can be integrated into a content stream that is provided to a user's device. The search results for a query such as the query identified at stage 220 for the topic "financial markets" may include, for example, one or more content items that are determined to be related to the topic of "financial markets." The system provides the populated stream of content to the user device that transmitted the request for content at stage 250.

Figure 3:
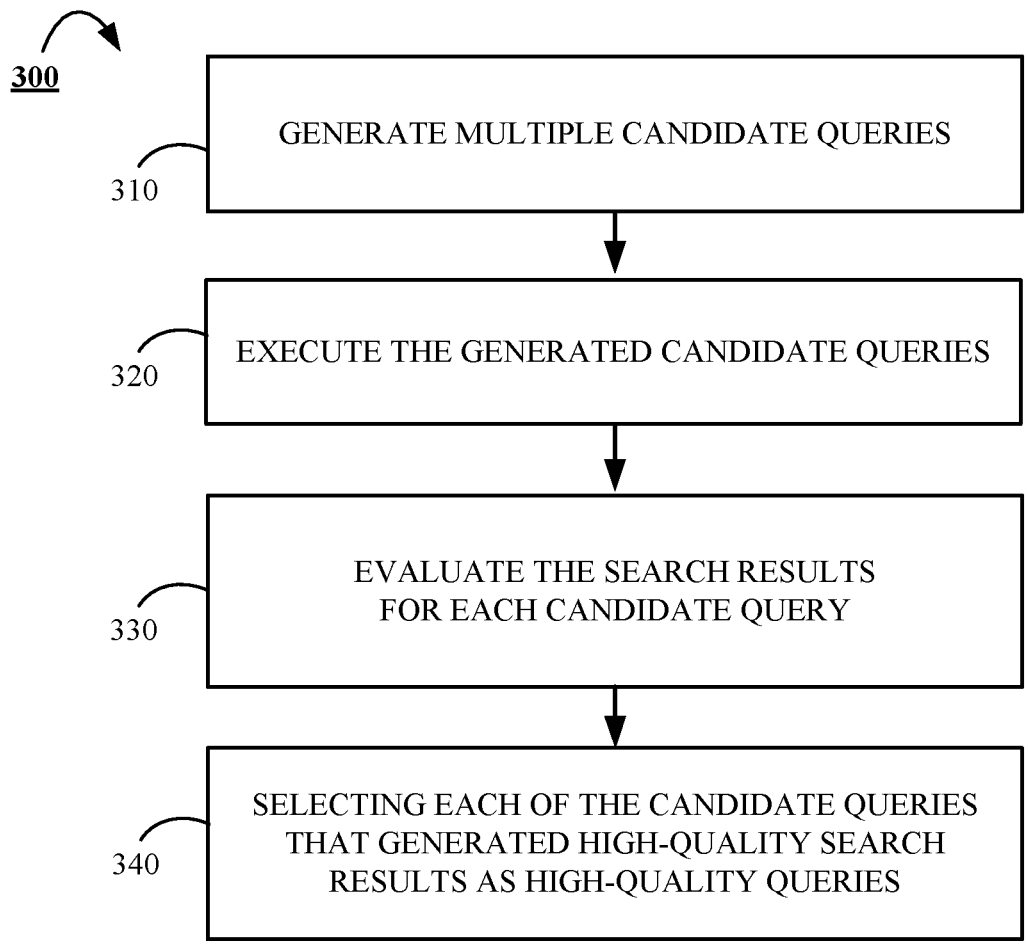
FIG. 3 is a flowchart of an example of a process for identifying high-quality queries.

FIG. 3 is a flowchart of an example of a process 300 for identifying high-quality queries. For convenience, the process 300 will be described as being performed by a system of one or more computers located in one or more locations. For example, a content population system, e.g., the content population system 140, appropriately programmed in accordance with this specification, can perform the process 300.

The system begins the process for identifying high quality queries by generating 310 multiple candidate queries. The generated candidate queries may vary in scope and include topical query parameters, entity based query parameters, or both. In some implementations, the candidate queries may be automatically generated based on topics, entities, or both that are determined to be related to a seed topic selected for a content stream. Alternatively, or in addition, may be generated by one or more expert users. Alternatively, or in addition, the one or more queries may be obtained from queries submitted via a search engine, social media platform, or the like by users seeking information related to a seed topic for a particular content stream. Each of the generated candidate queries may then be executed 320 in order to generate a set of search results for each respective candidate query.

The system evaluates 330 a respective set of search results for each generated candidate query to determine whether the search results for one or more generated candidate queries exceeds a predetermined quality threshold. Evaluating a respective set of search results includes, for example, determining a quality score for one or more particular quality characteristics such as precision, velocity, feedback, recall, or the like. A precision quality score may include, for example, a score that is indicative of the number of search results obtained by a query that are related to a particular topic. A velocity quality score may include, for example, a score that is based on the number of search results responsive to the query that were posted recently, for example, within a recent time window. A feedback quality score may include, for example, a score that is based on the number of engagements, reads, or both that are associated with the content items corresponding to search results responsive to the generated query. A recall score may include, for example, a score for a set of search results that is indicative of a ratio of the number of top content items related to a topic that are included in the set of search results over the total number of search results in the set of search results. In some implementations, a set of search results may be determined to exceed a predetermined quality threshold if the set of search results is associated with at least one quality score for a particular quality characteristic that exceeds a predetermined minimum threshold. Alternatively, in other implementations, a set of search results may be determined to exceed a predetermined quality threshold if each quality score for each respective quality characteristic associated the set of search results exceeds a predetermined minimum threshold.

The system selects 340 each of the candidate queries that were determined to produce high-quality search results in stage 330 as high-quality queries. The system can determine a topic that is associated with each respective high-quality query based on an evaluation of the topicality score associated with each search result in the set of search results for a particular query. Then, the system can assign each respective high-quality query to content streams that correspond to the same topic as the high-quality query.

Figure 4:
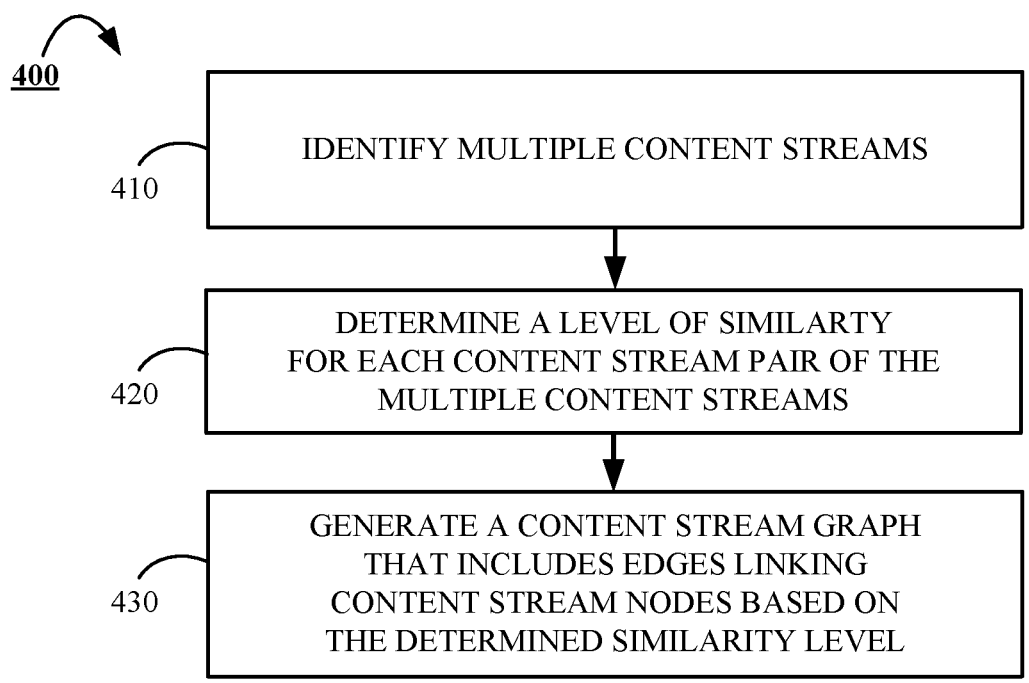
FIG. 4 is a flowchart of an example of a process for building a content stream similarity graph.

FIG. 4 is a flowchart of an example of a process 400 for building a content stream similarity graph. For convenience, the process 400 will be described as being performed by a system of one or more computers located in one or more locations. For example, a content population system, e.g., the content population system 140, appropriately programmed in accordance with this specification, can perform the process 400.

The process 400 begins with the system identifying 410 multiple different content streams. The content streams are identified by obtaining data using one or more indices, clustering the obtained data based on topic, and identifying one or more high-quality queries yielding high-quality content. Each content stream, of the multiple content stream, corresponds to a stream of content produced by one or more high-quality queries. The obtained data may include, for example, one or more content items that were provided to social media platform from one or more respective users.

The system then determines 420 the level of similarity between each pair of content streams in the set of multiple identified content streams. In some implementations, the similarity of a pair of content streams may be determined based on the percentage of data items in each respective content stream of the pair of content streams produced by the one or more high-quality queries that share the same topic.

The system generates 430 a content stream graph that includes links between content streams based on the determined similarity level. The content stream graph may include, for example, multiple nodes and multiple edges between pairs of nodes. Each node of the content stream graph corresponds to a respective content stream of the multiple content streams identified at stage 310. In some implementations, each particular node may be associated with one or more high-quality queries that were predetermined to provide high-quality search results for the content stream associated with the particular node. Each edge of the content stream graph corresponds to an indication of similarity between a pair of content stream nodes. For instance, in some implementations, an edge between a pair of nodes may only be generated if it is determined that the similarity level between the content streams corresponding to the pair of nodes exceeds a predetermined threshold.

Figure 5:
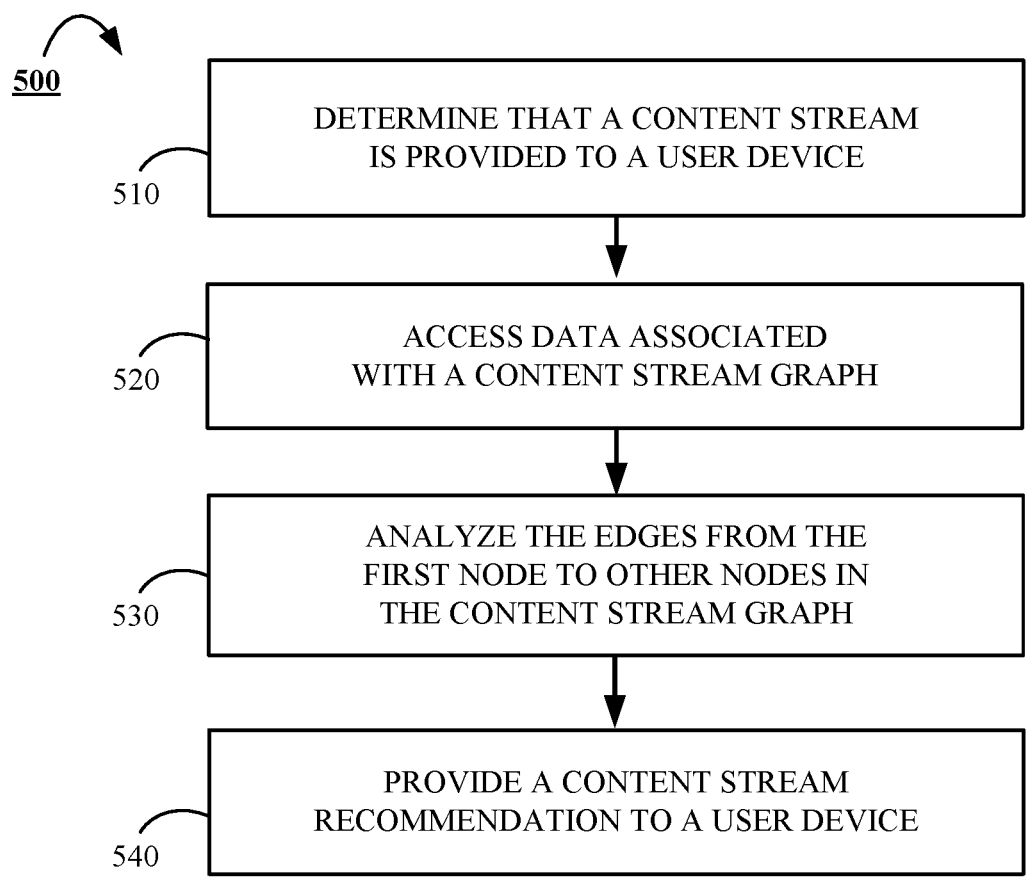
FIG. 5 is a flowchart of an example of a process for generating content stream recommendations using a content stream similarity graph.

FIG. 5 is a flowchart of an example of a process 500 for generating content stream recommendations using a content stream similarity graph. For convenience, the process 500 will be described as being performed by a system of one or more computers located in one or more locations. For example, a content population system, e.g., the content population system 140, appropriately programmed in accordance with this specification, can perform the process 500.

The process 500 begins when the system determines 510 that a particular content stream is being provided to a user device.

In response to determining that a particular content stream is being provided to a user device, the system accesses 520 a content stream graph. Accessing the content stream graph may include, for example, identifying an initial node in the content stream graph that corresponds to the particular content stream being provided to the user device. The system analyzes 530 the edges emanating from the identified initial node in order to identify one or more other nodes in the content stream graph that each correspond to a respective candidate content stream that is similar to the content stream being provided to the user device.

In some implementations, each edge of the content stream graph may be associated with metadata indicating the level of similarity between the content streams associated with each respective pair of nodes. For instance, the metadata may indicate a percentage of posts in each respective pair of content streams that have a common topic. In some implementations, the system may select a set of prospective candidate nodes that link to the initial node corresponding to the particular content stream being provided to the user device. The system may determine whether each of the prospective candidate nodes is linked to the initial nodes with an edge indicating that the content stream associated with the prospective candidate node and the initial node have more than a predetermined percentage of posts in common that share the same topic. In some implementations, the system may select as candidate content streams the content streams associated with the prospective candidate nodes that have more than a predetermined threshold percentage of posts in common with the content stream associated with the initial node that share the same topic. Alternatively, the system may select a set of candidate nodes by selecting all the prospective candidate nodes that have an edge connecting the prospective candidate node to the initial node via a graph edge.

The system provides 540 one or more content stream recommendations to the user device. The content recommendations may be based on, for example, the set of selected candidate nodes. The provided content recommendations may be in form of one or multiple links that each correspond to a particular content stream associated with a respective one of the candidate nodes. In response to the selection of one of the content stream recommendation links, the system may obtain one or more high-quality queries identified by the system that can be executed, and use the results of the executed high-quality query to populate a content stream being provided to the user device 110.

The content stream graph can be represented by any of a variety of convenient physical data structures. For example, the graph can be represented by triples that each represent two entities in order and a relationship from the first to the second entity; for example, [alpha, beta, is the father of], or [alpha, is the father of, beta], are alternative ways of representing the same fact. Each entity and each relationship can be and generally will be included in multiple triples. By way of example to the subject matter described by this disclosure, a triple can be used to describe the relationship between two content streams in a knowledge graph that lists the related content streams and their similarity level. The similarity level may include a percentage of the number of content items in each content stream that share the same topic. For example, such a triple may include [Financial Markets, U.S. Stock Markets, 87%].

Alternatively, each entity can be stored as a node once, as a record or an object, for example, and linked through a linked list data structure to all the relationships the entity has and all the other entities to which the entity is related. More specifically, the graph can be stored as an adjacency list in which the adjacency information includes relationship information.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A method of populating a stream of content relating to a particular topic, the method comprising:
   obtaining, by a content population system that includes (i) a query generation module, and (ii) a query evaluation module, data identifying a plurality of content items that may relate to the particular topic;
   generating, by the query generation module, a plurality of different queries for the particular topic;
   for each different query of the plurality of different queries for the particular topic:
      obtaining a set of search results for the query that identify content items identified in the obtained data; and
      determining, by the query evaluation module and from the search results for the query, a respective quality score for each search result and for each of one or more quality characteristics;

identifying, by the query evaluation module, one or more first high-quality queries from the plurality of queries based on the respective quality scores for the search results and for the one or more quality characteristics;

after the one or more first, high-quality queries are identified, receiving a content request for presenting a stream of content relating to the particular topic on a user device;

populating the stream of content using updated search results for the previously-identified, one or more first high-quality queries; and providing the stream of content for display on the user device.

2. The method of claim 1, further comprising:

obtaining data related to multiple different topics, wherein the obtained data corresponds to one or more social media posts that each originate from one or more disparate social media sources including one or more social media pages of respective individuals, one or more social media community pages, or one or more social media hashtags;

clustering the obtained data into a set of one or more groups based on a topic that is associated with each respective post; and identifying one or more second high-quality queries that correspond to each respective topic.

3. The method of claim 2, the method further comprising:

generating a set of one or more links for display on an interface of the user device, wherein each of the one or more links is associated with at least one of the second high-quality queries;

receiving a selection of a particular link of the generated set of links;

in response to a selection of the particular link of the generated set of links, executing the at least one second high-quality query that is associated with the particular link; and populating a stream of content using search results for the at least one second high-quality query.

4. The method of claim 1, wherein obtaining data identifying a plurality of content items that may relate to the particular topic:

obtaining data from at least two indices, wherein the two or more indices include a first index that organizes data in a database based on topic and a second index that organizes data in a database based on a user's social media profile.

5. The method of claim 1, wherein identifying one or more high-quality queries from the plurality of queries based on the quality scores for the quality characteristics comprises:

for each of the plurality of queries:

determining that the quality score for at least one of the quality characteristic that is associated with the respective set of search results obtained for the query exceeds a predetermined minimum threshold; and in response to determining that the particular value of at least one quality characteristic that is associated with the respective set of search results exceeds the predetermined minimum threshold, adding the high-quality query that corresponds to the respective set of search results to the identified queries.

6. The method of claim 1, wherein identifying one or more high-quality queries from the plurality of queries based on the quality scores for the quality characteristics comprises:

for each of the plurality of queries:

determining that each of the quality scores for the quality characteristics that are associated with the respective set of search results obtained for the query exceeds a predetermined minimum threshold; and in response to determining that the particular value of multiple quality characteristics that are associated with the respective set of search results exceeds the predetermined minimum threshold, adding the high-quality query that corresponds to the respective set of search results to the identified queries.

7. The method of claim 1, further comprising:

identifying a first node of a graph that corresponds to a stream of content that is associated with the provided stream of content, wherein the graph comprises a plurality of nodes each corresponding to a respective stream of content and a plurality of edges connecting nodes in the graph, each edge representing similarity between content streams corresponding to nodes connected by the edge;

analyzing edges from the first node to other nodes in the content stream graph to identify one or more other nodes that are each associated with a candidate stream of content that is similar to the provided stream of content; and providing a recommendation identifying the streams of content corresponding to the one or more other nodes for presentation on the user device.

8. The method of claim 1, wherein determining, from the search results for the query, a respective quality score for each of one or more quality characteristics includes:

determining a precision quality score that is based, at least in part, on a ratio of the number of search results returned by a particular query related to a particular topic over the total number of search results returned by the query.

9. The method of claim 1, wherein determining, from the search results for the query, a respective quality score for each of one or more quality characteristics includes:

determining a velocity quality score that is based, at least in part, on the number of search results responsive to the query that were posted within a recent time window.

10. The method of claim 1, wherein determining, from the search results for the query, a respective quality score for each of the one or more quality characteristics includes:

determining a feedback quality score that is based, at least in part, on the number of engagements associated with the set of search results.

11. The method of claim 1, wherein determining, from the search results for the query, a respective quality score for each of the one or more quality characteristics includes:

determining a recall quality score that is based, at least in part, on the ratio of top content items that are included in the set of search results over the total number of search results returned by the query.

12. A content population system that includes (i) a query generation module, and (ii) a query evaluation module, the content population system comprising:

one or more computers and one or more storage devices storing instructions that are operable, when executed by the one or more computers, to cause the one or more computers to perform operations comprising:

obtaining data identifying a plurality of content items that may relate to the particular topic;

generating, by the query generation module, a plurality of different queries for the particular topic;

for each different query of the plurality of different queries for the particular topic:

obtaining a set of search results for the query that identify content items identified in the obtained data; and determining, by the query evaluation module and from the search results for the query, a respective quality score for each search result and for each of one or more quality characteristics;

identifying, by the query evaluation module, one or more first high-quality queries from the plurality of queries based on the respective quality scores for the search results and for the one or more quality characteristics;

after the one or more first, high-quality queries are identified, receiving a content request for presenting a stream of content relating to the particular topic on a user device;

populating the stream of content using updated search results for the previously-identified, one or more first high-quality queries; and providing the stream of content for display on the user device.

13. The system of claim 12, the operations further comprising:

obtaining data related to multiple different topics, wherein the obtained data corresponds to one or more social media posts that each originate from one or more disparate social media sources including one or more social media pages of respective individuals, one or more social media community pages, or one or more social media hashtags;

clustering the obtained data into a set of one or more groups based on a topic that is associated with each respective post; and identifying one or more second high-quality queries that correspond to each respective topic.

14. The system of claim 12, wherein identifying one or more high-quality queries from the plurality of queries based on the quality scores for the quality characteristics comprises:

for each respective set of search results obtained for each of the plurality of queries:

determining that a particular value of at least one quality characteristic that is associated with the respective set of search results exceeds a predetermined minimum threshold; and in response to determining that the particular value of at least one quality characteristic that is associated with the respective set of search results exceeds the predetermined minimum threshold, adding the high-quality query that corresponds to the respective set of search results to the identified queries.

15. The system of claim 12, wherein identifying one or more high-quality queries from the plurality of queries based on the quality scores for the quality characteristics comprises:

for each respective set of search results obtained for each of the plurality of queries:

determining that a particular value of multiple quality characteristics that are associated with the respective set of search results exceeds a predetermined minimum threshold; and in response to determining that the particular value of multiple quality characteristics that are associated with the respective set of search results exceeds the predetermined minimum threshold, adding the high-quality query that corresponds to the respective set of search results to the identified queries.

16. The system of claim 12, wherein determining, from the search results for the query, a respective quality score for each of one or more quality characteristics includes:

determining a precision quality score that is based, at least in part, on a ratio of the number of search results returned by a particular query related to a particular topic over the total number of search results returned by the query.

17. The system of claim 12, wherein determining, from the search results for the query, a respective quality score for each of one or more quality characteristics includes:

determining a velocity quality score that is based, at least in part, on the number of search results responsive to the query that were posted within a recent time window.

18. The system of claim 12, wherein determining, from the search results for the query, a respective quality score for each of the one or more quality characteristics includes:

determining a feedback quality score that is based, at least in part, on the number of engagements associated with the set of search results.

19. The system of claim 12, wherein determining, from the search results for the query, a respective quality score for each of the one or more quality characteristics includes:

determining a recall quality score that is based, at least in part, on the ratio of top content items that are included in the set of search results over the total number of search results returned by the query.

20. A non-transitory computer-readable medium storing software comprising instructions executable by one or more computers which, upon such execution, cause the one or more computers to perform operations comprising:

obtaining, by a content population system that includes (i) a query generation module, and (ii) a query evaluation module, data identifying a plurality of content items that may relate to the particular topic;

generating, by the query generation module, a plurality of different queries for the particular topic;

for each different query of the plurality of different queries for the particular topic:

obtaining a set of search results for the query that identify content items identified in the obtained data; and determining, by the query evaluation module and from the search results for the query, a respective quality score for each search result and for each of one or more quality characteristics;

identifying, by the query evaluation module, one or more first high-quality queries from the plurality of queries based on the respective quality scores for the search results and for the one or more quality characteristics;

after the one or more first, high-quality queries are identified, receiving a content request for presenting a stream of content relating to the particular topic on a user device;

populating the stream of content using updated search results for the previously-identified, one or more first high-quality queries; and providing the stream of content for display on the user device.

* * * * *

UNITED STATES PATENT AND TRADEMARK OFFICE
CERTIFICATE OF CORRECTION

PATENT NO. : 10,409,818 B1  
APPLICATION NO. : 15/228756  
DATED : September 10, 2019  
INVENTOR(S) : Matthew Hayes et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this  
Thirtieth Day of June, 2020

Andrei Iancu  
*Director of the United States Patent and Trademark Office*